(No Model.)
J. E. EMERSON.
METAL PICKET FOR FENCES.
No. 421,685. Patented Feb. 18, 1890.
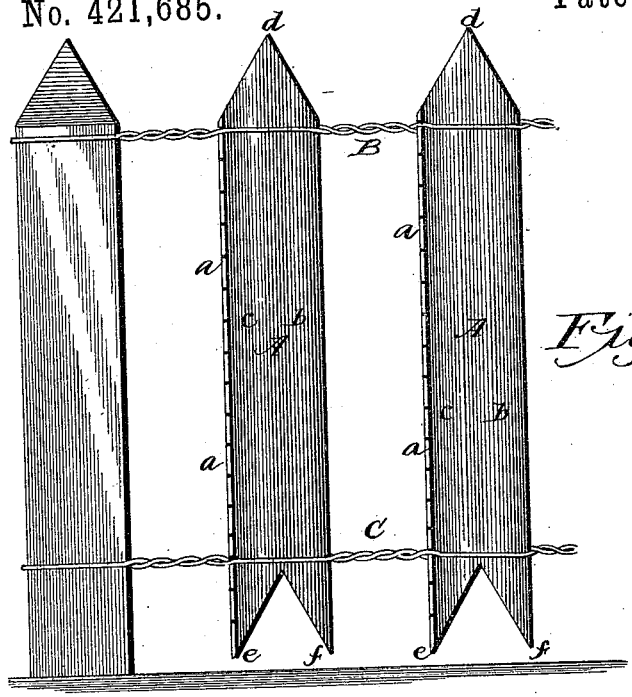
Fig. 1.
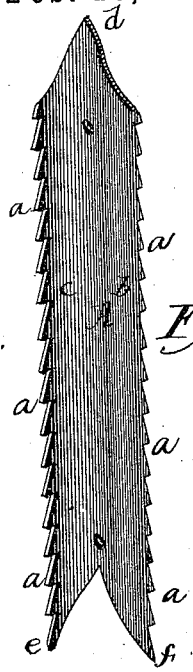
Fig. 2.
Fig. 3.  Fig. 4.
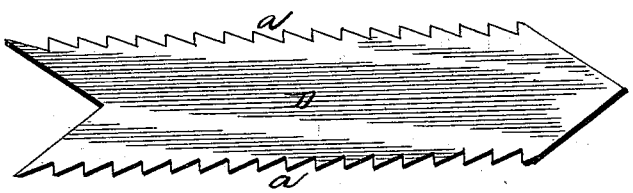
Fig. 5. Fig. 6.
Witnesses:
Geo. G. Thorpe
Edwin S. Clarkson
Inventor,
James E. Emerson
By Johnston, Reinohl
& Dyer
Attorneys.

UNITED STATES PATENT OFFICE.

JAMES E. EMERSON, OF BEAVER FALLS, PENNSYLVANIA.

METAL PICKET FOR FENCES.

SPECIFICATION forming part of Letters Patent No. 421,685, dated February 18, 1890.

Application filed December 13, 1889. Serial No. 333,575. (No model.)

*To all whom it may concern:*

Be it known that I, JAMES E. EMERSON, a citizen of the United States, residing at Beaver Falls, in the county of Beaver and State of Pennsylvania, have invented certain new and useful Improvements in Metal Pickets for Fences; and I do hereby declare the following to be a full, clear, and exact description of the invention, such as will enable others skilled in the art to which it appertains to make and use the same.

My invention relates to metal pickets for fences, and has for its object an improvement on the picket for which Letters Patent No. 358,602, bearing date of March 1, 1887, were granted to me.

In the use of metal fences of all kinds for inclosing lawns or fields in which cattle, horses, sheep, or hogs are permitted to pasture it is necessary to the safety of the animals that the barbs or projections on the fence shall project but little, if any, beyond the body of the fence, for the reason that such projections accidentally tear the flesh of the animals in passing along in close proximity to the fence when the animal has no intention to injure or break down the fence; yet the fence should possess or have some means provided to prevent vicious or evil-disposed animals from breaking it down intentionally.

To this end it is my purpose to provide the picket shown in my patent referred to with a serrated edge or edges which is or are so bent that said edge or edges form a projection to one or both sides of the fence.

The invention will be hereinafter described, and particularly pointed out in the claims.

In the accompanying drawings, which form part of this specification, Figure 1 represents a front elevation of a section of fence made from pickets of my improved construction; Fig. 2, a perspective of a picket detached; Fig. 3, a cross-section thereof; Fig. 4, a plan of a blank from which the picket is made, and Figs. 5 and 6 are transverse sections of modifications in the form of the picket.

Reference being had to the drawings and the letters thereon, A indicates a picket made of thin sheet metal, corrugated longitudinally, and having its edge or edges provided with serrated or pointed teeth $a$, which serve to engage with the upper and lower wires B C when the pickets are woven into wire, as in the ordinary wooden picket fence in common use, and hold the picket in its proper position on the wires. It will be observed that the teeth $a$ are presented on one or both sides of the picket, and that they do not project beyond the highest point $b$ of the convexity in the corrugations $c$ in the picket, and that the body or major portion of the picket is a plain smooth surface.

The upper end of the picket is pointed, as at $d$, and the lower end is provided with a sharp-angled crotch, the points $e$ $f$ of which may be driven into the ground or into a wooden sill, upon which the fence may be erected, or the pickets may be square at their lower ends and rest upon the ground or the wooden sill.

The pickets may be provided with screw or nail holes $g$, for securing them to an upper and lower rail in a fence. From the fact that the edge of the picket and the convexity in the body thereof on either side of the picket are in the same vertical plane the two points named on one side of the picket will rest upon the rails and form a good strong bearing for the picket.

The picket may be made with a single corrugation and provided with serrations in one edge only, as shown in Fig. 5, and the pickets reversed on the fence to bring the serrated edges on both sides of the fence, or the picket may have a series of corrugations, as shown in Fig. 6.

In the manufacture of my improved metal picket blanks D are cut from a strip of thin sheet metal, preferably steel. The blank is then passed through a machine in which the teeth $a$ are cut into the edge or edges of the blank, after which it is put into dies and the corrugations $c$ formed, or passed through or between rolls having a pass corresponding with the corrugations in the picket.

By forming the serrations or teeth $a$ in the edge or edges of the picket and bending the edges to the opposite sides of the picket and keeping them in line with the highest point $b$ of the convexity in the corrugations no injury can befall an animal walking along in the line of the fence; but should the animal bear against the fence to rub or push it will come in contact with the serrations, which will hurt it sufficiently to cause it to stop.

Having thus fully described my invention, what I claim is—

1. A thin metal picket having longitudinal corrugations and one of its edges provided with serrations or pointed teeth terminating in or near the plane of the body of the picket, substantially as described.

2. A thin metal picket having longitudinal corrugations and serrated edges, said edges being bent to face opposite sides of the picket, substantially as described.

3. A thin metal picket having longitudinal corrugations and serrated edges, said edges being bent to face opposite sides and terminating in a plane coincident with the convexity on the sides of the picket, substantially as described.

In testimony whereof I affix my signature in presence of two witnesses.

JAMES E. EMERSON.

Witnesses:
  D. C. REINOHL,
  WM. E. DYRE.